(12) United States Patent
Beck et al.

(10) Patent No.: US 7,034,280 B2
(45) Date of Patent: Apr. 25, 2006

(54) LIGHT GRID

(75) Inventors: Michael Beck, Waldkirch (DE); Daniel Rieger, Freiburg (DE); Frank Haberstroh, Waldkirch (DE)

(73) Assignee: Sick AG, Waldkirch and Breisgau (DE)

( * ) Notice: Subject to any disclaimer, the term of this patent is extended or adjusted under 35 U.S.C. 154(b) by 56 days.

(21) Appl. No.: 10/880,327

(22) Filed: Jun. 29, 2004

(65) Prior Publication Data

US 2005/0205763 A1    Sep. 22, 2005

(30) Foreign Application Priority Data

Jul. 2, 2003    (DE) ................ 103 29 881

(51) Int. Cl.
*H01J 40/14*    (2006.01)
*G08B 13/18*    (2006.01)

(52) U.S. Cl. .................. 250/221; 250/222.1; 340/555
(58) Field of Classification Search ............... 250/221, 250/222.1; 340/555, 556, 557
See application file for complete search history.

(56) References Cited

U.S. PATENT DOCUMENTS

| | | |
|---|---|---|
| 4,430,568 A | 2/1984 | Yoshida et al. |
| 5,065,418 A | 11/1991 | Bermbach et al. |
| 5,243,183 A | 9/1993 | Barron, Jr. et al. |
| 5,424,532 A * | 6/1995 | Occheto et al. ............ 250/221 |
| 5,461,227 A * | 10/1995 | Blau ......................... 250/221 |

FOREIGN PATENT DOCUMENTS

| | | |
|---|---|---|
| CA | 1093192 | 1/1981 |
| DE | 295 00 873.3 | 4/1995 |
| DE | 44 22 497 A1 | 1/1996 |
| DE | 44 24 537 A1 | 1/1996 |
| DE | 196 01 661 C1 | 7/1997 |
| DE | 197 30 885 A1 | 1/1999 |
| DE | 198 35 884 A1 | 2/2000 |
| DE | 199 46 476 A1 | 3/2001 |
| DE | 100 38 025 C2 | 3/2002 |
| DE | 101 42 161 A1 | 3/2003 |

* cited by examiner

*Primary Examiner*—Kevin Pyo
(74) *Attorney, Agent, or Firm*—Harness, Dickey & Pierce

(57) ABSTRACT

The invention relates to a light grid having a transmitter strip for the transmission of a plurality of light beams and a receiver strip for the reception of these light beams, an evaluation unit for the processing of received signals generated in dependence on the light beams received and a memory for reference values which can be compared with the received signals by means of the evaluation unit, with a position transducer being provided for the determination of the position of an object introduced into the monitored zone of the evaluation unit being able to be supplied with position signals supplied by the position transducer and the comparison of the reference values with the received values being able to be carried out in dependence on the position signals.

27 Claims, 2 Drawing Sheets

LIGHT GRID

FIELD OF INVENTION

The invention relates to a light grid having a transmitter strip for the transmission of a plurality of light beams and a receiver strip for the reception of these light beams, an evaluation unit for the processing of received signals generated in dependence on the light beams received and a memory for reference values which can be compared to the received signals by means of the evaluation unit.

BACKGROUND OF THE INVENTION

Such light grids are known from the prior art and serve, for example, to monitor areally extended monitored zones or protected fields for intrusions, for example by persons, and, on intrusion by a person, to generate a control signal which results, for example, in the switching off of a machine which has moving parts which could endanger the person intruding into the monitored zone. The use of a light grid is conceivable in the region of any kind of machines which can give rise to any kinds of danger.

A light grid is known from the German patent specification DE 44 22 497 C2 which does not generally result in a switching off of a machine when an object or a person intrudes into its monitored zone. This known light grid rather makes it possible to teach a fixed time sequence of permitted intrusions into the monitored zone of the light grid which then accordingly does not result in a switching off of the machine. It becomes possible in this manner, for example in the course of a bending procedure, for a workpiece to carry out a specific movement in which parts of the workpiece move through the monitored zone without a switching off of the machine taking place.

The fact is disadvantageous with this known light grid that only such permitted movements can be taught which run in a fixedly pre-determined time sequence.

SUMMARY OF THE INVENTION

It is accordingly an object of the present invention to further develop a light grid of the initially named kind such that any type of permitted movements which do not result in a switching off of a machine can be taught without these movements having to run in a fixed time pattern.

This object is satisfied in accordance with the invention in that a position transducer is provided for the determination of the position of an object introduced into the monitored zone of the light grid; in that the evaluation unit can be supplied with position signals delivered by the position transducer; and in that the comparison of the reference values with the received values can be carried out in dependence on the position signals.

It consequently becomes possible by the design of a light grid in accordance with the invention to determine the specific position of an object in the monitored zone. These object positions can then be taken into account on the comparison of the reference values with the received signals. Specifically, it is possible to associate respective object positions with the stored reference values and then only to compare the received signals delivered for an actually present object position with those reference values which correspond to the momentarily actually present object position. It thus becomes possible in accordance with the invention to teach permitted object movements as position-dependent reference values which do not result in a switching off of a machine or in the transmission of a control signal. These object movements can take place at different speeds in any desired time sequences from process to process, which results in substantial advantages in the practical use of the light grids in accordance with the invention. It is, for example, possible to move permitted objects through the monitored zone by means of a conveyor belt, with the conveyor belt being able to run at varying speeds from object to object or also during the passing of one single object through the monitored zone. It is moreover possible to stop the transport procedure as required and subsequently to restart it or to have the transport procedure run in different directions, without this resulting in an unwanted switching off of a machine.

In accordance with the invention, objects which do not represent any danger on intrusion into a monitored zone can therefore be distinguished from such objects or persons which give rise to dangers on intrusion into the monitored zone. This distinction takes place independently of the speed or of the time sequence of the movements.

The position transducer used in accordance with the invention can consist of a path encoder, in particular an incremental encoder, cooperating with a conveyor means. Such an incremental encoder can precisely take up the movements of a conveyor means and transmit signals corresponding to the movements to the evaluation unit. The information delivered by the position transducer can include both paths and directions of movement. If information with respect to the direction of movement is also transmitted, it is possible in accordance with the invention to let a conveyor means also run backwards, for example, for a short time during the transport of a permitted object through the monitored zone and then to subsequently continue the transport procedure again without an unwanted switch-off signal being triggered. Moreover, a position transducer can also transmit information with respect to its sound functioning to the evaluation unit, which is an absolute necessity for some applications in the safety area.

It is alternatively also possible to realize the position transducer in that a speed sensor is provided which cooperates with a conveyor means and is coupled to a timer. The path covered by a respective object can be calculated from the speed determined in this manner in dependence on the time measured such that ultimately the function of a path encoder is again provided.

The position transducer can have resolutions matched to the respective requirements. The resolution can, for example, amount to less than 1 cm, in particular less than 1 mm and preferably to approximately ¹⁄₂₅₀ mm.

Adjacent light beams of the light grid in accordance with the invention preferably have a spacing from one another which amounts to between 10 mm and 80 mm. This spacing ultimately determines with how many light beams an object is scanned at an object position. The more light beams that are used for this, the more exactly the object can be determined in that direction which extends parallel to the longitudinal extent of the transmitter strip and of the receiver strip.

It is particularly advantageous for the transmitter strip and/or the receiver strip to be provided with a diaphragm which limits the light beams in a direction extending perpendicular to the monitored plane. It is achieved by such a diaphragm that the effective width which extends perpendicular to the monitored plane is limited, whereby the resolution can be increased on the recognition of objects in the direction extending perpendicular to the monitored plane. It can accordingly be ensured by this measure that even those objects can be recognized which only have a very low extent in a direction perpendicular to the monitored plane.

The diaphragm can be made as a slit diaphragm, in particular with a slit width between 1 mm and 3 mm, extending in the longitudinal direction of the transmitter strip and/or of the receiver strip. It is particularly advantageous from a technical manufacturing aspect for a common slit diaphragm to be provided for all light beams such that the slit extends over almost the total length of the transmitter strip and/or of the receiver strip.

The transmitter strip and/or receiver strip can extend at least substantially perpendicular to the object movement. It is, however, also alternatively possible to orient the transmitter strip and/or receiver strip at a different angle to 90° to the object movement, for example at between 45° and 135°. In this case, edges extending perpendicular to the conveying direction do not bring about any sudden switching of a plurality of receivers of the receiver strip, but rather a sequential switching of these receivers taking place briefly after one another. It hereby becomes possible to recognize the said edges more precisely.

It is preferred for the evaluation unit to be integrated into the transmitter strip and/or receiver strip such that no additional housing is required for the evaluation unit.

The evaluation unit can be present in duplicate, each checking the other in order to meet existing safety requirements in this manner.

In a method in accordance with the invention for the operation of a light grid in accordance with the above description, a respective reference value is stored in the memory for specific light beams, preferably for each light beam, for pre-determined positions of the object. Specifically, whether light reception should be present or not can be stored with respect to a specific object position for every light beam extending between the transmitter strip and the receiver strip. Ultimately, a number of reference values, which corresponds to the number of existing transmitter or receiver modules in the transmitter strip or receiver strip, therefore then exists for every object position. Such sequences of reference values can be stored for a plurality of object positions, with it naturally also being possible for the stored sequences to differ from one another in dependence on the respective object shape.

It is preferred for a respective reference value to be stored for each light beam for all positions of the object which can be determined and for which at least part of the object is located in the monitored zone. A permitted object can be determined with the highest possible accuracy in this manner. It is alternatively also possible only to store either reference values for every light beam or only reference values for specific light beams for specific positions of the object. This is, for example, sensible when a particularly high resolution is not required.

When the received signals with respect to an object position differ from the reference values with respect to the said object positions, a control signal can be generated which can cause any desired processes, for example a switching off of a machine. To avoid incorrect triggerings of a control signal, for example by an insect passing through the monitored zone, it can be predetermined that a control signal will only be generated when a difference between the received signals and the respective associated reference values is present for a plurality of objecting positions, in particular for two or three object positions, which follow one another.

It is furthermore preferred for the said control signal only to be generated when the difference exceeds a pre-set tolerance threshold. Incorrect triggerings of the control signal can be avoided in this manner.

The invention can be used particularly advantageously when a recognition signal is generated on agreement of the received signals with respect to a sequence of object positions with reference values with respect to these object positions. A recognition signal can therefore be emitted when a permitted object passes through the monitored zone. It is in particular possible to distinguish different permitted objects from one another which pass through the monitored zone.

The last advantage requires reference values to be able to be stored in the memory for different permitted objects and/or for different permitted object movements.

The reference values are advantageously determined by means of a teach-in procedure. A corresponding push button, which activates a teach-in mode, can be provided for this purpose at the light grid in accordance with the invention. Within the framework of the teach-in process, the permitted object to be taught can then preferably be moved through the monitored zone at a low speed. Reference values can then either be determined for all object positions which can be determined or corresponding teach points, for which reference values are to be stored and which correspond to specific object positions, are fixed by means of a sensor, for example. Such teach points are preferably set at the start and at the end of objects and of openings in objects as well as just before and just after steep edges of an object and with large gradient changes in the object shape. Further reference values which lie between the teach points are calculated from the teach points by means of linear interpolation, for example.

On conclusion of a teach-in process, it is then possible to switch over to normal operation in which the passing through of the monitored zone by a previously taught object does not bring about any triggering of a control signal. Instead, the aforementioned already explained recognition signal can be emitted.

Further advantageous embodiments of the invention are recited in the dependent claims.

BRIEF DESCRIPTION OF THE DRAWINGS

The invention will be described in more detail in the following with reference to embodiments and to the drawings; there are shown in these.

DETAILED DESCRIPTION OF THE PREFERRED EMBODIMENTS

The following description of the preferred embodiment is merely exemplary in nature and is in no way intended to limit the invention, its application, or uses.

Figure 1:
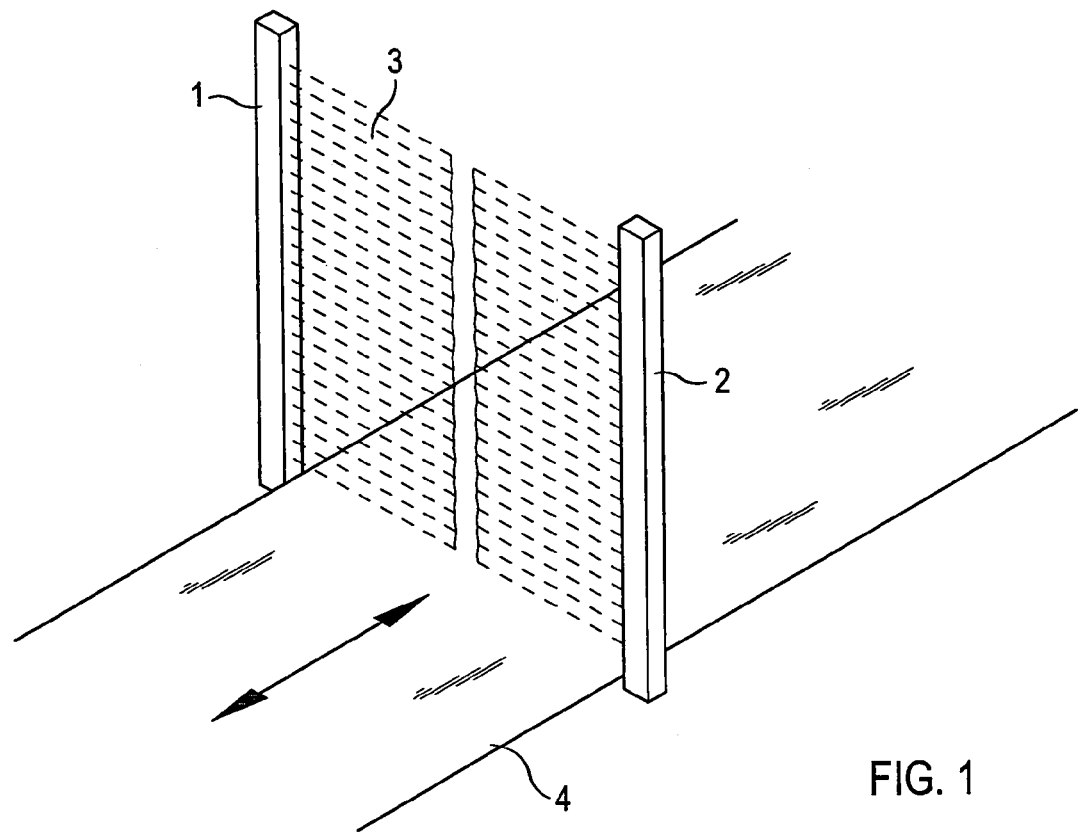
FIG. 1 is a schematic perspective view of a light grid in accordance with the invention.

FIG. 1 shows a transmitter strip 1 and a receiver strip 2 arranged opposite it which each have an elongate shape. A plurality of transmitter modules which are not shown in FIG.

1 are provided arranged next to one another along the transmitter strip 1, with each transmitter module having a corresponding receiver module associated with it in the receiver strip 2 such that light beams 3 can be transmitted from the transmitter modules of the transmitter strip 1 and can be received by the receiver modules of the receiver strip 2. These light beams 3 can be encoded in a known manner in order to avoid malfunctions in this way. The synchronization between the transmitter strip 1 and the receiver strip 2 can likewise take place in any desired, known manner, with both a wired and a wireless synchronization being possible.

The area extending between the transmitter strip 1 and the receiver strip represents the monitored plane of the light grid consisting of the transmitter strip 1 and of the receiver strip 2. The light beams 3 running parallel to one another extend within this monitored zone.

The light grid 1, 2 shown is capable of detecting when individual light beams 3 or a plurality thereof are interrupted by an object or by a person, whereupon corresponding control signals can then be emitted by the light grid 1, 2.

In accordance with FIG. 1, a conveyor belt 4 extends beneath the light grid 1, 2 and can transport objects through the monitored zone of the light grid 1, 2. In accordance with the double arrow drawn in, two conveying directions are possible in this process.

Figure 2:
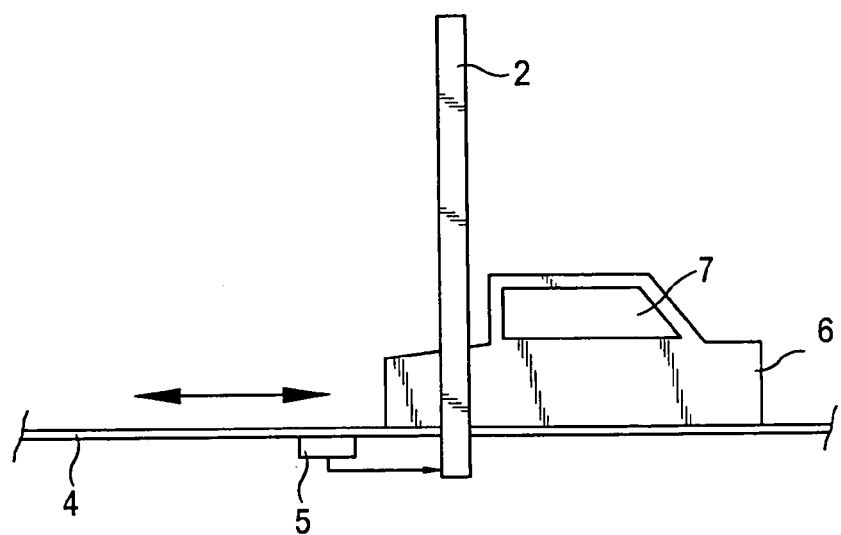
FIG. 2 is a side view of the light grid in accordance with FIG. 1 with an object located in the monitored zone.

FIG. 2 shows a side view of the apparatus in accordance with FIG. 1.

It can be seen from FIG. 2 that the conveyor belt is coupled to the position transducer which is capable of detecting movements of the conveyor belt 4 in both directions and of transmitting corresponding information to the receiver strip 2 in which an evaluation unit (not shown) working in accordance with the invention is provided. Reference is made to the following explanations with respect to FIG. 3 regarding the operation of the evaluation unit.

An object 6, in the exemplary representation of FIG. 2 a body of a vehicle, is located on the conveyor belt 4. This body 6 is naturally made in a light transmitting manner in its region 7 designed for the windows. The receiver strip 2 will accordingly receive light beams 3 which pass through the light transmitting region 7 when the light transmitting region 7 is located in the monitored plane. If reference values corresponding to the body 6 are now stored which define the body 6 with its light transmitting region 7 as a permitted object, no control signal is triggered by the apparatus in accordance with the invention when the body 6 moves through the monitored plane. If, however, a person is located inside the body who at least partly prevents a reception of the light beams passing through the light transmitting region 7, the received signals of the receiver strip 2 differ from the stored reference values such that a control signal is emitted. Accordingly, using the apparatus in accordance with the invention, not only outer contours, but also structures of any desired complexity can be taught as permitted objects which have any desired arrangements of light transmitting and non light transmitting regions.

Figure 3:
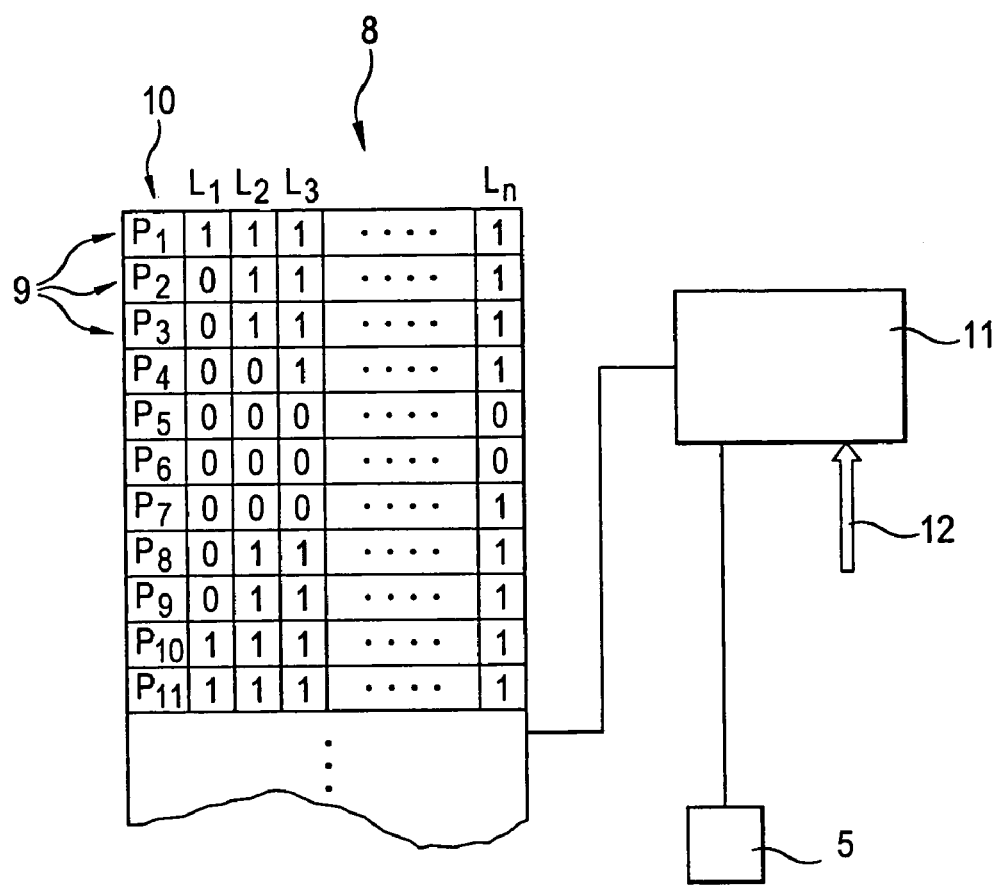
FIG. 3 is a block diagram of the storage, evaluation and position transducer modules cooperating with one another in accordance with the invention.

FIG. 3 shows a memory coming into use in accordance with the invention in which reference values and positional information associated therewith can be stored. The memory 8 shown by way of example in FIG. 3 has a plurality of lines 9, with each line corresponding to a specific object position $P_i$. The first position of the line 9 in each case includes the positional information $P_i$ such that a column 10 with positional information $P_i$ results. The following positions of the lines 9 then each have reference values which are associated with the respective object position $P_i$. The number n of the reference values corresponds to the number n of the light beams $L_1$–$L_n$ which extend between the transmitter strip 1 and the receiver strip 2. It is thus stored for each light beam $L_j$ for every position $P_i$ of a permitted object whether the receiver module associated with the respective light beam $L_j$ receives light or not. In the case of light reception being present, the reference value is set at "1", in the other case it is set at "0".

Not only the reference values for the passing of a specific permitted object through the monitored zone can be stored in the memory 8. It is rather the case that reference values and positional information can be stored for a plurality of different permitted objects or permitted object movements.

The evaluation unit 11 is capable of accessing the values of the memory 8 and of processing them. In the course of this processing, values delivered by the position transducer 5 and the received signals of the receiver strip 2 received via the input 12 are accessed. As already explained, it is determined in the framework of this processing whether the received signals for a specific object position determined by means of the position transducer 5 agree with the reference values of the memory 8 stored for this object position. In the event of agreement, the emission of a control signal, for example for the switching off of a machine, can then be suppressed by the evaluation unit 11 and the emission of a recognition signal for a permitted object can be triggered.

Figure 4:
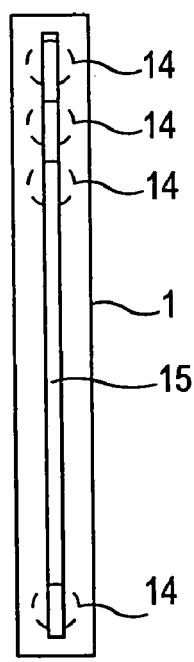
FIG. 4 is the schematic plan view of the light exit side of a preferred embodiment of a transmitter strip coming into use in accordance with the invention.

FIG. 4 shows a preferred embodiment of a transmitter strip 1, with the plan view of the light exit side of the transmitter strip 1 being shown.

The transmitter strip 1 has a plurality n of transmitter components which are arranged next to one another and which are covered by a common slit diaphragm 15. In this manner, a limitation of the transmitted light beams results in a direction perpendicular to the monitored plane, whereby the initially already explained advantages result.

REFERENCE NUMERAL LIST 1 transmitter strip
2 receiver strip
3 light beams
4 conveyor belt
5 position transducer
6 object
7 light transmitting region
8 memory
9 lines
10 column
11 evaluation unit
12 received signal
14 receiver modules
15 slit diaphragm The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A light grid having a transmitter strip (1) for the transmission of a plurality of light beams (3) and a receiver strip (2) for the reception of these light beams (3), an evaluation unit (11) for the processing of received signals generated in dependence on the light beams (3) received and a memory (8) for reference values which can be compared with the received signals by means of the evaluation unit (11), characterized in that a position transducer (5) is provided for the determination of the position of an object (6) introduced into the monitored zone of the light grid (12); in that the evaluation unit (11) can be supplied with position signals delivered by the position transducer (5); and in that the comparison of the reference values with the received signals can be carried out in dependence on the position signals.

2. A light grid in accordance with claim 1, characterized in that the position transducer (5) consists of a path encoder cooperating with a conveyor means (4).

3. A light grid in accordance with claim 1, characterized in that the position transducer (5) consists of a speed sensor which cooperates with a conveyor means (4) and which is coupled to a timer.

4. A light grid in accordance with claim 1, characterized in that object movements in opposite directions can be determined by means of the position transducer (5).

5. A light grid in accordance with claim 1, characterized in that the position of the object (6) can be determined by means of the position transducer (5) with a resolution of less than 1 cm.

6. A light grid in accordance with claim 1, characterized in that adjacent light beams (3) have a spacing from one another of between 10 and 80 mm.

7. A light grid in accordance with claim 1, characterized in that the transmitter and/or receiver strip (1, 2) is provided with a diaphragm (15) which limits the light beams (3) in a direction extending perpendicular to the monitored plane.

8. A light grid in accordance with claim 7, characterized in that the diaphragm (15) is made as a slit diaphragm, extending in the longitudinal direction of the transmitter strip and/or of the receiver strip.

9. A light grid in accordance with claim 7, characterized in that a common slit diaphragm (15) is provided for all light beams (3).

10. A light grid in accordance with claim 1, characterized in that the transmitter and/or receiver strips (1, 2) extend at least substantially perpendicular to the object movement.

11. A light grid in accordance with claim 1, characterized in that the transmitter and/or receiver strips (1, 2) extend at an angle of between 45° and 135°, but not at an angle of 90°, to the object movement.

12. A light grid in accordance with claim 1, characterized in that the evaluation unit (11) is integrated into the transmitter and/or receiver strip (1, 2).

13. A light grid in accordance with claim 1, characterized in that the evaluation unit (11) is present in duplicate, each checking the other.

14. A method for the operation of a light grid (1, 2) having a transmitter strip (1) for the transmission of a plurality of light beams (3) and a receiver strip (2) for the reception of these light beams (3), an evaluation unit (11) for the processing of received signals generated in dependence on the light beams (3) received and a memory (8) for reference values which can be compared with the received signals by means of the evaluation unit (11), wherein a position transducer (5) is provided for the determination of the position of an object (6) introduced into the monitored zone of the light grid (12); wherein the evaluation unit (11) can be supplied with position signals delivered by the position transducer (5); and wherein the comparison of the reference values with the received signals can be carried out in dependence on the position signals, characterized in that a respective reference value is stored in the memory (8) for predetermined positions of the object (6) for specific light beams (3).

15. A method in accordance with claim 14, characterized in that a respective reference value is stored in the memory (8) for each light beam (3) for all positions of the object (6) which can be determined and for which part of the object (6) is located in the monitored zone.

16. A method in accordance with claim 14, characterized in that a control signal is generated when the received signals with respect to an object position differ from the reference values with respect to the said object position.

17. A method in accordance with claim 14, characterized in that a control signal is only generated when a difference is found for a plurality of object positions.

18. A method in accordance with claim 14, characterized in that a control signal is only generated when the difference exceeds a pre-set tolerance threshold.

19. A method in accordance with claim 14, characterized in that a recognition signal is generated on agreement of the received signals with respect to a sequence of object positions with reference values with respect to these object positions.

20. A method in accordance with claim 14, characterized in that reference values are stored in the memory (8) for different objects (6) and/or for different object movements.

21. A method in accordance with claim 14, characterized in that the reference values are determined in the teach-in mode.

22. A light grid in accordance with claim 1, characterized in that the position transducer (5) consists of a path encoder that is an incremental encoder, cooperating with a conveyor means (4).

23. A light grid in accordance with claim 1, characterized in that the position of the object (6) can be determined by means of the position transducer (5) with a resolution of less than 1 mm.

24. A light grid in accordance with claim 1, characterized in that the position of the object (6) can be determined by means of the position transducer (5) with a resolution of less than approximately 1/250 mm.

25. A light grid in accordance with claim 7, characterized in that the diaphragm (15) is made as a slit diaphragm, with a slit width between 1 mm and 3 mm, extending in the longitudinal direction of the transmitter strip and/or of the receiver strip.

26. A method in accordance with claim 14 wherein a respective reference value is stored in the memory (8) for predetermined positions of the object (6) for each light beam (3).

27. A method in accordance with claim 14, characterized in that a control signal is only generated when a difference is found for two or three object positions, following one another.

* * * * *